United States Patent

Eriksson et al.

[11] Patent Number: 5,989,437
[45] Date of Patent: Nov. 23, 1999

[54] APPARATUS FOR PRODUCING AIR-SATURATED WATER

[76] Inventors: Hans Eriksson, PL 7811, Rimbo, Sweden, S-762 93; Kent Isaksson, Västergarden 30, Norrtålje, Sweden, S-761 94

[21] Appl. No.: 08/875,123
[22] PCT Filed: Jan. 18, 1996
[86] PCT No.: PCT/SE96/00040
  § 371 Date: Jul. 17, 1997
  § 102(e) Date: Jul. 17, 1997
[87] PCT Pub. No.: WO96/22248
  PCT Pub. Date: Jul. 25, 1996

[30] Foreign Application Priority Data

Jan. 19, 1995 [SE] Sweden ................................. 9500215

[51] Int. Cl.⁶ ...................... B01D 17/12; B01D 17/035
[52] U.S. Cl. ........................ 210/744; 137/1; 209/168; 210/97; 210/541; 210/703; 261/59; 261/118
[58] Field of Search ........................ 209/168, 169, 209/170; 210/97, 104, 198.1, 205, 218, 221.1, 221.2, 541, 542, 703, 744; 261/115, 118, 119.1, 59, 64.1, 66; 137/1

[56] References Cited

U.S. PATENT DOCUMENTS

| 1,646,019 | 10/1927 | Forrester | 210/703 |
|---|---|---|---|
| 3,175,687 | 3/1965 | Jones | 210/205 |
| 3,243,046 | 3/1966 | Kakumoto et al. | 210/205 |
| 3,479,281 | 11/1969 | Kikindai et al. | 210/703 |
| 5,484,534 | 1/1996 | Edmondson | 210/703 |
| 5,543,089 | 8/1996 | Pichardo | 261/118 |

FOREIGN PATENT DOCUMENTS 2190853  12/1987  United Kingdom .

Primary Examiner—Joseph W. Drodge
Attorney, Agent, or Firm—Young & Thompson

[57] ABSTRACT

An apparatus for producing highly pressurized air-saturated water intended preferably for dispersion in flotation plants, has, preferably, an upstanding cylindrical pressure vessel (21) which, in operation, is filled partially to a controlled level with pressurized water flowing through an opening in the bottom part of the vessel, and partially by continuously delivered pressurized air, wherein the air is dissolved in the water during its passage through the pressure vessel (21). Pressurized water is delivered to the apparatus in the upper end of the pressure vessel (21) through a spray element (24) or the like to effectively break up the water flow. The spray element is arranged so that at least part of the water flow is sprayed on to the inner wall surfaces of the vessel (21) which, in operation, surround the air-filled part and together with this part produce a curtain of water which substantially covers the inner wall surfaces. Compressed air is delivered to the air-filled part through a connecting pipe (27) provided in the vessel wall in this part of the apparatus.

11 Claims, 1 Drawing Sheet

APPARATUS FOR PRODUCING AIR-SATURATED WATER

TECHNICAL FIELD

The present invention relates to apparatus for producing pressurized gas-saturated liquid, said apparatus comprising a pressure vessel having pressurized gas and liquid delivery means, means for tapping-off gas-saturated liquid, and means for maintaining a predetermined level of liquid in the pressure vessel.

DESCRIPTION OF THE BACKGROUND ART

Flotation plants are used to an ever-increasing extent in the purification of water, both drinking water and sewage water, with the intention of increasing the rate at which the water flows through the purification plant and therewith also enable the size of the necessary tanks and thus the purification plant as a whole to be reduced. With regard to drinking water, the requirements of the end product are essentially unitary and the construction of a purification plant is essentially determined by the nature of the water source or procurement. When the water source is a lake or river, coarse particles are normally separated from the water in a screening chamber, whereafter the water is purified chemically and biologically by adding thereto precipitation and flocculating agents in a flocculating chamber. The precipitated particles are then separated from the water, by allowing the particles to settle to the bottom of a sedimentation tank gravitationally. Different types of particles will have different densities and therewith different settling rates. In order for particles of low densities, "light particles", to have time to settle as the water passes through a sedimentation tank, the tank must be given a large surface area so to provide the long period of time taken for such light particles to settle.

Particle separation times can be greatly reduced by flotation processes, in which there are added to the water microscopic air bubbles to which particles or particle flocs in the water adhere. These bubbles also contribute in forming particle flocs and in maintaining floc coherency. Air bubbles rise quickly to the surface of the water, carrying with them the adhered particles and particle flocs, these flocs forming a stable coating of slime on the surface of the water, which can be removed with the aid of scrapers or by intermittently raising the water level in the flotation tank so that the slime coating will flow into a slime chute provided at one edge of the tank.

The microscopic air bubbles used in flotation processes have a diameter of 30–80 $\mu$m and cannot be produced by simply injecting air directly into water, for instance. Microscopic air bubbles intended for drinking water flotation processes are normally produced by releasing pressurized air into clean water from a pressure vessel. The highest possible degree of saturation is sought for in this regard. This water, normally referred to as dispersion water, is conducted to an inlet for water that has undergone a flocculation process, so-called flocculated water, and which is situated at the bottom of the flotation tank, while maintaining the high pressure of said water, and is there delivered to the flocculated water through separate nozzles or jets which are constructed to generate an instantaneous decrease in pressure to a level at which the air dissolved in the water is released in the form of microscopic bubbles and forms a dispersion of air in the water.

Those pressure vessels used to produce pressurized dispersion water that has been saturated with air to the greatest possible extent are normally kept half full with water with the aid of control equipment and associated water level sensor means, and the incoming and outgoing flows of water are located beneath the surface of the water in the pressure vessel. Compressed air is delivered to the air-filled space above the water surface and the vessel has a relatively large size so as to obtain a large surface contact between air and water. In another known design, the diameter of the pressure vessel has been reduced, said pressure vessel often being man high, and the thus reduced air/water contact surface is compensated for by delivering the water through a nozzle provided in the vessel side wall in the air space, through which nozzles the water is injected onto the opposing vessel wall, therewith disintegrating the water jets to some extent.

With regard to water purification, the flotation method takes a much shorter time to effect and this shorter through-flow time enables purification plants to be made smaller with retained capacity.

The reduction in the space requirements of such purification plants opens new avenues of use. Such development requires all components to be given smaller dimensions and preferably also improved properties. This also applies to the dispersion water preparing unit, in which water that has already been cleaned or purified is used and recycled. An increase in the degree of air saturation in the dispersion water reduces the need of recycled water and therewith improves the efficiency of the purification plant as a whole.

DISCLOSURE OF THE INVENTION

The object of the present invention is to provide apparatus for producing dispersion liquid having a high degree of gas saturation. Another object is to provide means which combines high capacity with small dimensions. These objects are achieved with apparatus having the characteristic features set forth in the following claims.

BRIEF DESCRIPTION OF THE DRAWING

The invention will now be described in more detail with reference to an exemplifying embodiment thereof and also with reference to the accompanying drawing, in which.

DESCRIPTION OF A PREFERRED EMBODIMENT

Figure 1:
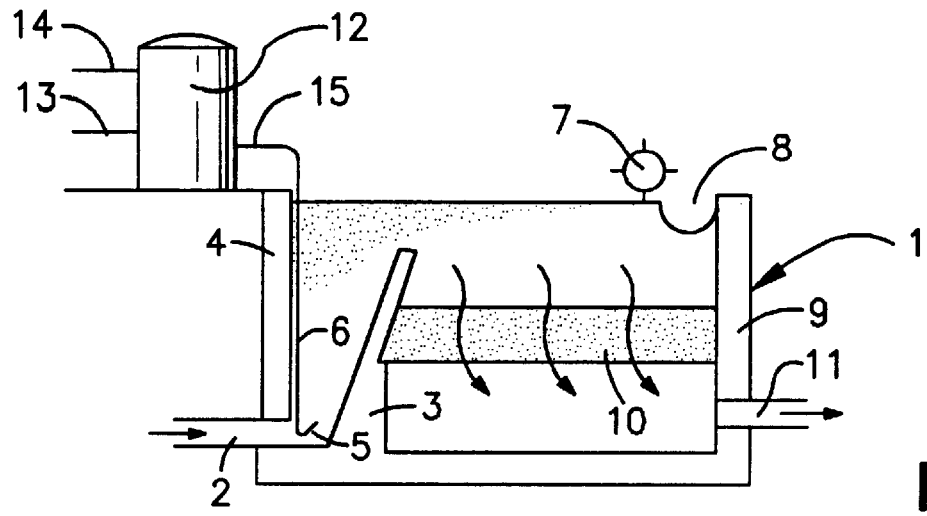
FIG. 1 is a schematic, sectioned side view of a conventionally equipped flotation tank.

FIG. 1 is a schematic, sectioned side view of a conventionally equipped flotation tank referenced generally 1. The tank includes an inlet 2 to which water is delivered from a flocculation chamber, not shown. The water is caused to flow upwards in the tank 1, by an inclined barrier or baffle 3 mounted inwardly of the inlet 2. There is formed between the tank wall 4 and the baffle 3 a pocket into which an array of distribution pipes 6 provided with nozzles or jets 5 open out, of which pipes one pipe 6 is shown in the drawing. The pipe 6 functions to deliver air-saturated water, dispersion water, to the flocculated water flowing into the tank through the inlet 2, wherein the pressurized injected dispersion water speeds up movement of the flocculated water. The nozzles or jets 5 are constructed to cause the pressure of the dispersion water to be lowered instantaneously, therewith releasing air from the dispersion water and forming microscopic bubbles which as they travel towards the surface of the water collect particles and particle flocs and move the major part of these particles and flocs quickly to the surface of the water and there form a covering of slime, which is removed and deposited in a slime chute 8 located adjacent the tank wall 9, with the aid of some form of slime scraper 7, or is removed in some other way. Heavy particles which cannot be collected by the microscopic bubbles and lifted to the surface are captured in a filter 10 disposed between the rear side of the baffle 3 and the tank wall 9 and through which the cleaned or purified water passes on its way to a purified water tank (not shown) through an outlet 11. Part of the purified water is pumped from the clean water tank at high pressure to the water inlet 13 of a pressure. vessel 12. The pressure vessel 12, in which the dispersion water is produced, is supplied with compressed air from a compressor (not shown) through an air intake 14, and the air-saturated water is then fed back to the nozzles 5 mounted in the flotation tank, via an outlet 15 and the distribution pipe 6.

Figure 2:
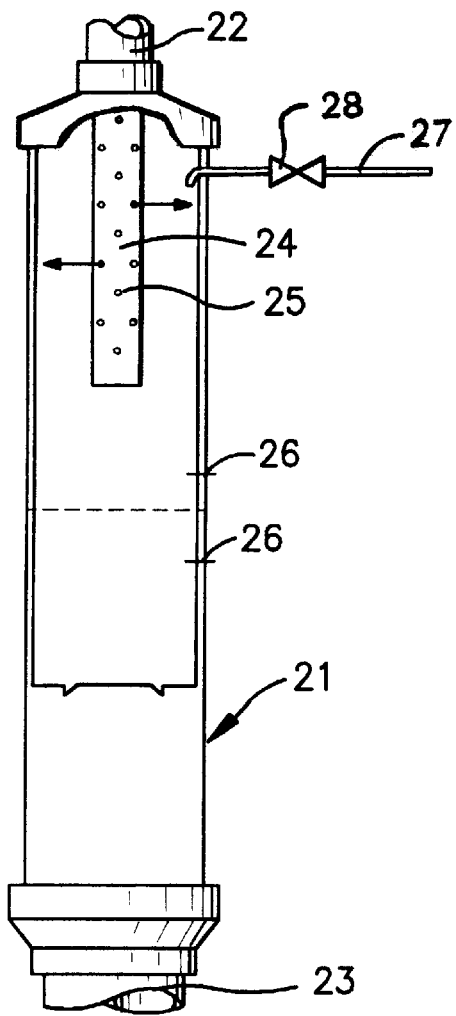
FIG. 2 is a partially sectioned view of inventive dispersion water producing apparatus.

FIG. 2 is a schematic, partially sectioned view of inventive apparatus for producing dispersion water. The apparatus includes a vertically arranged pressure vessel 21 which is comprised of commercially available pipe or tube sections and has the form of an enlargement between an inlet pipe 22 is, arranged at a top cover of the vesseel, and an outlet pipe 23 is arranged at a bottom cover of the vessel. The inlet pipe 22 is, arranged at a top cover of the vessel, opens into a spray arrangement or extension pipe 24 which is centrally disposed within and arranged co-axial with the vessel, and which has the form of an inlet pipe extension and which is closed at its free end. The mantle surface of the extension pipe 24 is perforated totally with fine spray holes 25, of which only a few are shown in FIG. 2. In operation, the pressure vessel 21 is half filled with water and two sensor means 26 provided in the vessel wall send signals to control means (not shown) which decreases or increases the water supply as necessary, or alternatively adjusts the air pressure in the pressure vessel 21. Compressed air is delivered via the pipe 27 and is controlled by a solenoid valve 28 mounted on the pipe 27. As illustrated in FIG. 2 with a pair of broken arrows, in operation water is sprayed from the spray arrangement 24 in a direction essentially perpendicular to the inner wall of the pressure vessel, and onto the inner wall of the pressure vessel which is thereby covered with a curtain of water to which fresh- water is continuously supplied and therewith constantly maintain maximum air absorbency of the curtain. As seen from FIG. 2, a portion of the top cover of the vessel overhangs the vessel and is in radial alignment with at least some of the spray holes 25 of the extension 24.

The ability of the inventive apparatus to take-up or absorb air is a great improvement on earlier known apparatus designed for this purpose, therewith enabling the dimensions of the inventive apparatus to be substantially reduced in comparison with the dimensions of the known apparatus. For instance, a conventional apparatus having a height of almost 2 m and a diameter of 35 cm can be replaced with inventive apparatus having a height of about 1 m and a diameter of 10 cm.

Because of these reductions in dimensions, conventional pressure vessels designed for particular purposes can be replaced with a 4" pipe provided with reduction couplings as end-walls, and an inlet pipe of 1" and an outlet pipe of 2", for instance.

Although the described and illustrated embodiment relates to the production of air-saturated water which shall be delivered to a flotation tank in a water purification plant, it will be understood that the invention can also be applied in respect of other gases and liquids.

We claim:

1. Apparatus for producinq pressurized gas-saturated liquid, said apparatus comprising a pressure vessel (21) having means (27, 24, 23) for delivering pressurized gas and liquid, means for tapping-off gas-saturated liquid, and means (26) for maintaining the liquid at a predetermined level in the pressure vessel, characterized in that the pressurized gas and liquid delivery means (27, 24) are mounted in an upper part of the vessel; the liquid delivery means has a plurality of openings (25) which face towards a surrounding inner wall of the vessel; the pressure vessel is an upstanding cylinder (21); and the liquid delivery means is a perforated tube (24) which is closed at one end and mounted concentrically in the cylinder.

2. A method for producing liquid saturated with gas, the steps of said method including feeding liquid to be saturated with gas through an inlet pipe (22) coupled to an inlet at an upper part of a standing cylindrical pressure vessel (21) having a top cover and a bottom cover for causing pressurized liquid to flow through said vessel from said inlet to an outlet at a lower part of said vessel for filing said vessel to a controlled level with pressurized liquid, and feeding gas under pressure to said vessel, wherein said gas is dissolved in said liquid flowing between said inlet and said outlet, characterized in that said method further comprises the steps of splitting the flow of incoming liquid into a plurality of jets by means of a spray arrangement (24) such that at least one of said jets is directed essentially perpendicular to an inner cylindrical wall of said vessel (21), said plurality of jets creating multiple impact points at least on said cylindrical inner wall of said vessel for creating a stirred liquid curtain essentially covering the entire cylindrical inner wall of said vessel in the volume of said vessel above said controlled level.

3. The method according to claim 2, characterized in that at least one of said plurality of jets is at the level of said top cover of said vessel.

4. An apparatus for carrying out the method according to claim 2, said apparatus comprising a standing cylindrical pressure vessel (21) having a top cover and a bottom cover, an inlet for liquid provided at an upper portion of said vessel and an outlet for liquid provided at a lower portion of said vessel such that said vessel is filled to a controlled level with pressurized liquid flowing between said inlet and said outlet, and a gas inlet on said vessel for supplying pressurized gas to said vessel such that said pressurized gas is dissolved in said pressurized liquid as said pressurized liquid flows through said vessel between said inlet for liquid and said outlet for liquid, characterized in that a spray arrangement (24) is coupled to said inlet for liquid, said spray arrangement adapted to split the flow of liquid from said inlet for liquid into a plurality of jets, at least one of said plurality of jets jets being directed essentially perpendicular to a cylindrical inner wall of said vessel so that said plurality of jets create multiple impact points at least on said cylindrical inner wall of said vessel for creating a stirred liquid curtain essentially covering the entire cylindrical inner wall of said vessel in the volume of said vessel above said controlled level.

5. The apparatus according to claim 4, characterized in that said inlet for liquid extends through said top cover of said vessel, and said spray arrangement (24) coupled to said inlet for liquid is arranged co-axially with said vessel.

6. The apparatus according to claim 5, characterized in that said spray arrangement (24) is arranged to spray liquid at the level of said top cover of said vessel.

7. The apparatus according to claim 6, characterized in that said outlet for liquid is arranged at said bottom cover of said vessel.

8. The apparatus according to claim 5, characterized in that said outlet for liquid is arranged at said bottom cover of said vessel.

9. The apparatus as claimed in claim 4, characterized in that said spray arrangement (24) is arranged to spray liquid at the level of said top cover of said vessel.

10. The apparatus according to claim 9, characterized in that said outlet for liquid is arranged at said bottom cover of said vessel.

11. The apparatus according to claim 4, characterized in that said outlet for liquid is arranged at said bottom cover of said vessel.

* * * * *